United States Patent
Yuan

(10) Patent No.: US 10,036,452 B2
(45) Date of Patent: Jul. 31, 2018

(54) CONTINUOUSLY VARIABLE TRANSMISSION POWER BEARING

(71) Applicant: Hefei Chuangyuan Vehicle Control Technology Co., Ltd., Hefei (CN)

(72) Inventor: Tinghua Yuan, Hefei (CN)

(73) Assignee: Hefei Chuangyuan Vehicle Control Technology Co., Ltd., Hefei (CN)

( * ) Notice: Subject to any disclaimer, the term of this patent is extended or adjusted under 35 U.S.C. 154(b) by 0 days.

(21) Appl. No.: 15/560,165

(22) PCT Filed: Mar. 24, 2016

(86) PCT No.: PCT/CN2016/077206
§ 371 (c)(1),
(2) Date: Sep. 21, 2017

(87) PCT Pub. No.: WO2016/155558
PCT Pub. Date: Oct. 6, 2016

(65) Prior Publication Data
US 2018/0080531 A1 Mar. 22, 2018

(30) Foreign Application Priority Data
Apr. 3, 2015 (CN) .......................... 2015 1 0156710

(51) Int. Cl.
*F16H 55/10* (2006.01)
*F16H 15/50* (2006.01)
*B62M 11/06* (2006.01)

(52) U.S. Cl.
CPC ............. *F16H 15/50* (2013.01); *B62M 11/06* (2013.01)

(58) Field of Classification Search
CPC ................................ F16H 15/50; B62M 11/06
See application file for complete search history.

(56) References Cited

U.S. PATENT DOCUMENTS 1,508,220 A * 9/1924 Frey ......................... F16H 29/18
74/112
RE30,364 E * 8/1980 Harris ..................... F16H 29/16
74/116

(Continued)

FOREIGN PATENT DOCUMENTS

| CN | 2260200 Y | 8/1997 |
| CN | 201687913 U | 12/2010 |

(Continued)

*Primary Examiner* — David M Fenstermacher
(74) *Attorney, Agent, or Firm* — Gokalp Bayramoglu

(57) ABSTRACT

A continuously variable speed power bearing includes a bearing driving inner ring, a bearing driven outer ring, and a movable tooth assembly. A circle of movable tooth grooves are arranged on a periphery of the bearing driving inner ring, the movable tooth assembly is embedded into corresponding movable tooth grooves in a one-to-one mode. The bottoms of the movable tooth grooves are connected to a high-pressure oil inlet. An inner peripheral surface of the bearing driven outer ring is a variable diameter surface, and the variable diameter surface is evenly divided into a plurality of equal parts. Each corresponding equal part has an equal variable diameter and the same direction, and an outer end part of the movable tooth assembly fits the variable diameter surface.

7 Claims, 5 Drawing Sheets

(56) References Cited

U.S. PATENT DOCUMENTS

| | | | | |
|---|---|---|---|---|
| 4,259,874 A | * | 4/1981 | Guirriec | F16G 5/16 474/245 |
| 4,326,431 A | * | 4/1982 | Stephenson | F16H 3/426 74/397 |
| 5,071,394 A | * | 12/1991 | Lester | F16H 15/00 475/185 |
| 5,288,280 A | * | 2/1994 | Polnik | B62M 11/14 475/185 |
| 5,351,568 A | * | 10/1994 | Feterl | F16H 25/06 74/116 |
| 5,950,488 A | | 9/1999 | Abdallah | |
| 7,124,658 B2 | * | 10/2006 | Fischer | F16H 29/18 74/111 |

FOREIGN PATENT DOCUMENTS

| | | |
|---|---|---|
| CN | 104864051 A | 8/2015 |
| CN | 204628458 U | 9/2015 |
| GB | 793089 A | 4/1958 |

\* cited by examiner

US 10,036,452 B2

CONTINUOUSLY VARIABLE TRANSMISSION POWER BEARING

CROSS REFERENCE TO RELATED APPLICATIONS

This application is the national phase entry of International Application No. PCT/CN2016/077206, filed on Mar. 24, 2016, which is based upon and claims priority to Chinese Patent Application No. CN201510156710.8 (CN), filed on Apr. 3, 2015, the entire contents of which are incorporated herein by reference.

TECHNICAL FIELD

The invention relates to the field of mechanical transmission, particularly to a continuously variable speed power bearing with a clutch function.

BACKGROUND OF THE INVENTION

At present, most of the transmissions used in the automotive industry are transmissions with a fixed speed ratio. Most automobiles are equipped with a gear automatic transmission (AT), which is low in transmission efficiency, complex in manufacturing, and high in cost. The driving wheel and the driven wheel of an existing continuously variable transmission (CVT) transmit power through friction, and this transmission mode cannot achieve large-torque power transmission.

The invention aims to provide a continuously variable speed power bearing so that the power of the bearing inner ring can be asynchronously transmitted to the bearing outer ring during the rotating process of the bearing and the continuously variable speed is realized by adjusting the pressure of the high-pressure oil.

SUMMARY OF THE INVENTION

The technical solutions of the invention are as follows:

A continuously variable speed power bearing comprises a bearing driving inner ring, a bearing driven outer ring, and a movable tooth assembly; a circle of movable tooth grooves are arranged on a periphery of the bearing driving inner ring, the movable tooth assembly is embedded into corresponding movable tooth grooves in a one-to-one mode, and bottoms of the movable tooth grooves are connected to a high-pressure oil inlet; an inner peripheral surface of the bearing driven outer ring is a variable diameter surface, the variable diameter surface is evenly divided into a plurality of equal parts, each corresponding equal part has an equal variable diameter and the same direction, and an outer end part of the movable tooth assembly fits the variable diameter surface.

Each movable tooth of the movable tooth assembly comprises a movable tooth supporting body and a rolling column movable tooth connected to an outer end of the movable tooth supporting body, and a plurality of notches are formed on a side of the movable tooth supporting body, opposite to a movable tooth groove.

The continuously variable speed power bearing further comprises a movable tooth transmission. The movable tooth transmission comprises a speed ratio control unit, a high-pressure oil pump, a bearing driven outer ring speed sensor for measuring a speed of the bearing driven outer ring, a speed ratio given signal input end and a bearing driving inner ring rotating speed signal input end, wherein a high-pressure oil outlet of the high-pressure oil pump is connected to a high-pressure oil inlet, and the speed ratio given signal input end and the bearing driving inner ring rotating speed signal input end are connected to a system control center.

The outer peripheral surface is a power output surface, and the power output surface is in form of a tooth, a roller column or a circumferential surface.

The high-pressure oil inlet is provided on the bearing driving inner ring, and the bottoms of the movable tooth grooves are connected to the high-pressure oil inlet through a high-pressure oil way.

The equal parts of the variable diameter surface include an arc section with a decreasing distance from large to small relative to the circle center of the variable diameter surface, an arc section with an increasing distance from small to large relative to the circle center of the variable diameter surface, and an arc section with a non-variable diameter.

The movable tooth assembly is in contact with the variable-diameter surface so that the continuously variable speed power bearing can provide large torque output. The variable diameter surface is divided into a plurality of equal sections, and each corresponding equal section has the same variable diameter and the same direction, so that the transmission power is balanced in the radial direction relative to the circle center, and no eccentric force is generated.

According to the present invention, the power of the bearing inner ring can be transmitted to the bearing outer ring asynchronously during the rotating process of the bearing, to realize the continuously variable speed through adjusting the pressure of the high-pressure oil. Therefore, the continuously variable speed with a high efficiency and a large-torque is realized. Meanwhile, the present invention has the advantages of radial power balance, a low noise, a compact structure, a small size and low manufacturing costs, and thus has certain industrial practicability.

DETAILED DESCRIPTION OF THE INVENTION

Figure 1:
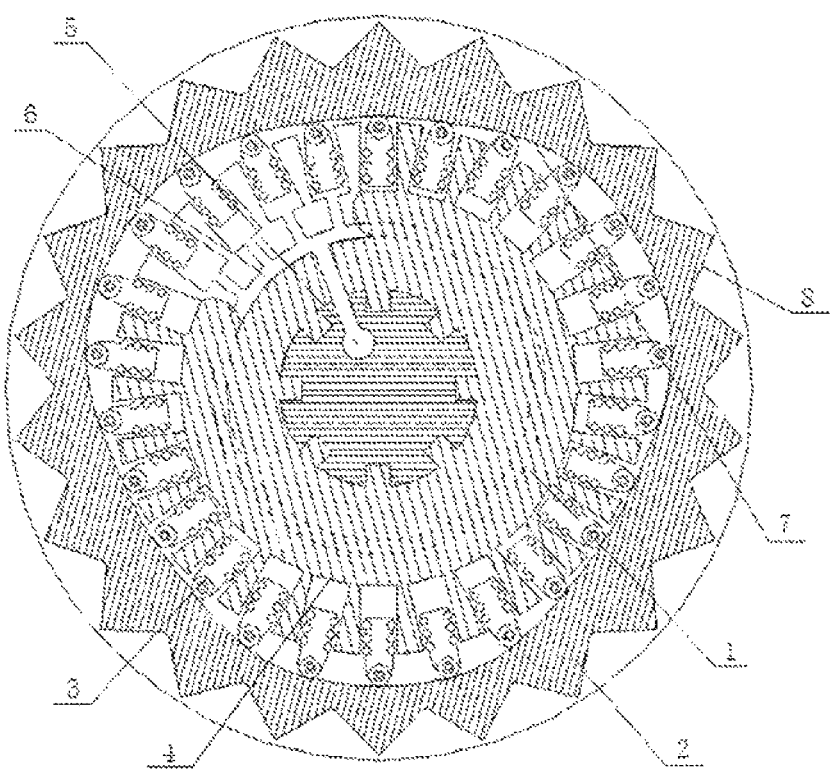
FIG. 1 is a schematic structural diagram of the present invention.

As shown in FIG. 1, a continuously variable speed power bearing comprises a bearing driving inner ring 1 and a bearing driven outer ring 2, a movable tooth assembly 3 and a movable tooth transmission. A circle of movable tooth grooves 4 are arranged on the periphery of the bearing driving inner ring 1. The movable teeth of movable tooth assembly 3 are embedded into the corresponding movable tooth grooves 4 in a one-to-one mode. The bottoms of the movable tooth grooves 4 are connected to a high-pressure oil inlet 5 on the bearing driving inner ring through a high-pressure oil way 6. The inner peripheral surface of the bearing driven outer ring 2 is a variable diameter surface 7, while the outer peripheral surface is a power output surface 8. The power output surface 8 is in the form of a tooth, a roller column, or a circumferential surface. The variable diameter surface is evenly divided into three equal parts, and each corresponding equal part has an equal variable diameter and the same direction. The outer end part of the movable tooth assembly 3 fits the variable diameter surface.

Figure 2:
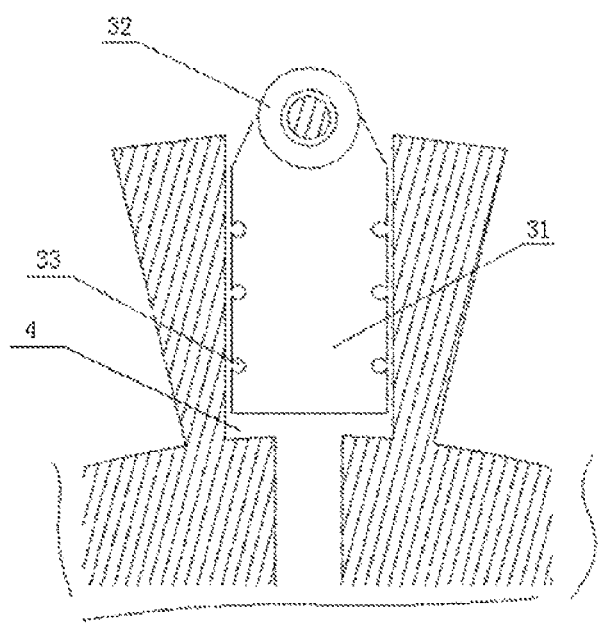
FIG. 2 is a schematic structural diagram of a movable tooth assembly according to the present invention.

As shown in FIG. 2, each movable tooth of the movable tooth assembly 3 comprises a movable tooth supporting body 31 and a rolling column movable tooth 32 connected to the outer end of the movable tooth supporting body 31. A row of circular notches 33 are formed on each side of the movable tooth supporting body 31, opposite to the movable tooth groove 4.

Figure 3:
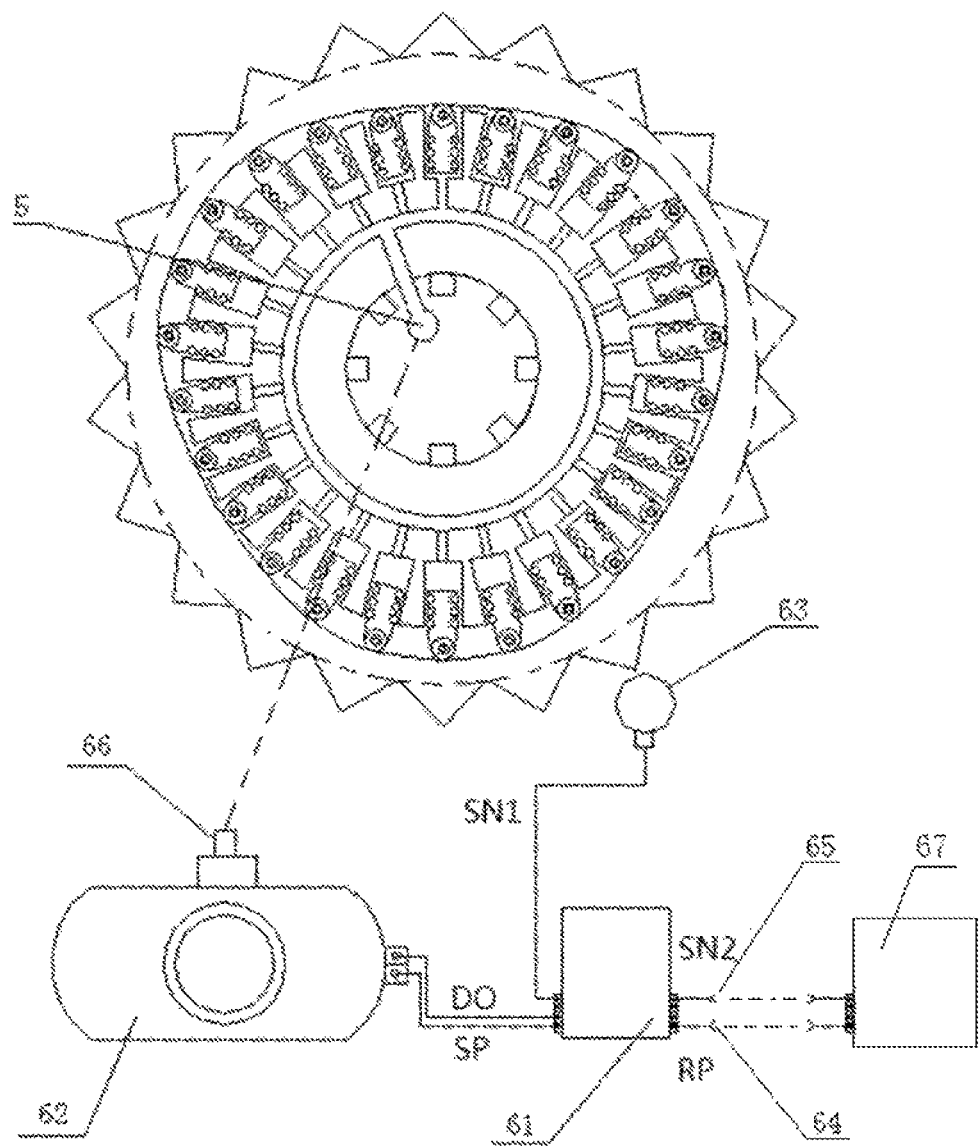
FIG. 3 is a schematic structural diagram of a movable tooth transmission according to the present invention.

As shown in FIG. 3, the movable tooth transmission comprises a speed ratio control unit 61, a high-pressure oil pump 62, a bearing driven outer ring speed sensor 63, a speed ratio given signal input end 64 and a bearing driving inner ring rotating speed signal input end 65, wherein the high-pressure oil pump 62, the bearing driven outer ring speed sensor 63, the speed ratio given signal input end 64 and the bearing driving inner ring rotating speed signal input end 65 are respectively connected to the speed ratio control unit 61. The high-pressure oil outlet 66 of the high-pressure oil pump is connected to the high-pressure oil inlet 5. The speed ratio control unit 61 acquires an oil pressure signal of the high-pressure oil pump 62 and outputs a control signal to the high-pressure oil pump 63 through the control output terminal to control the output pressure of the high-pressure oil. The bearing driven outer ring speed sensor 63 is used for acquiring the rotating speed signal of the bearing driven outer ring 2. The speed ratio given signal input end 64, and the bearing driving inner ring rotating speed signal input end 65 are connected to the system control center 67, and are used for acquiring a rotating speed signal of the bearing driving inner ring 1 and a speed ratio given signal of the bearing driving inner ring 1 and the bearing driven outer ring 2.

Figure 4:
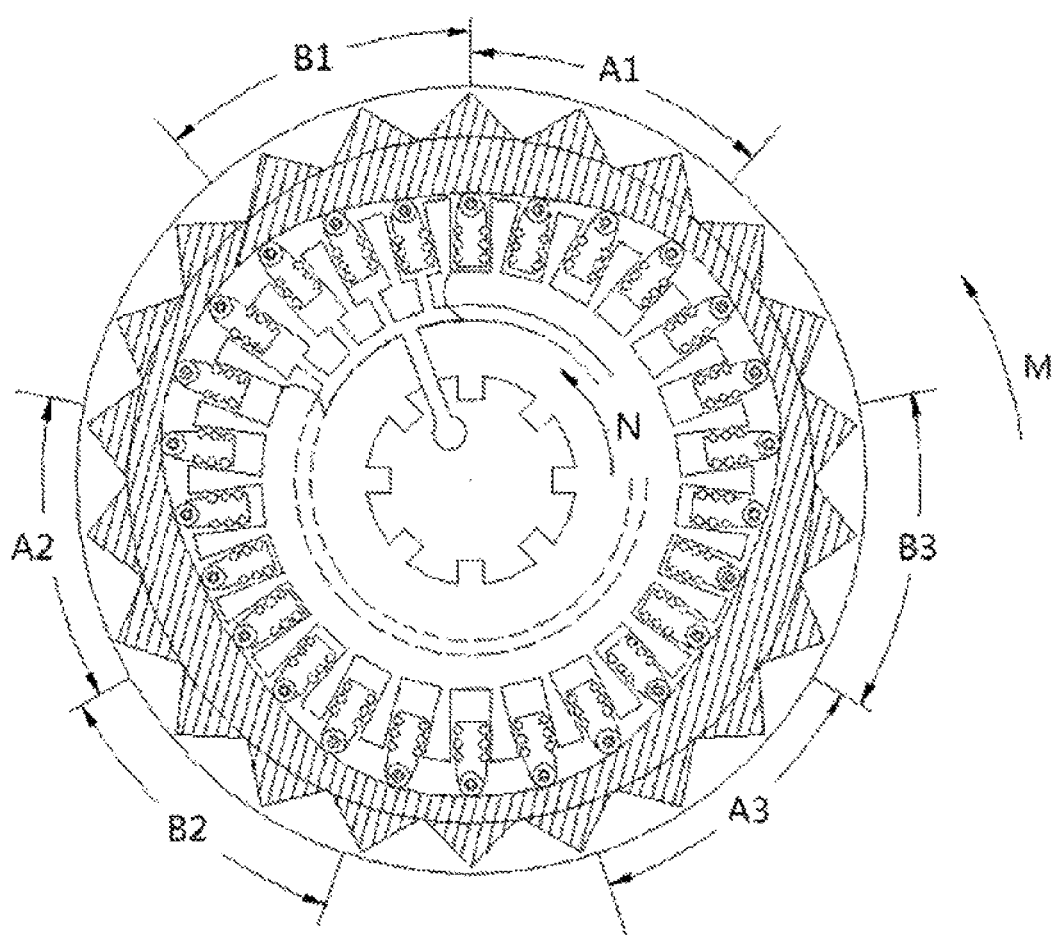
FIG. 4 is a stress analysis diagram of rotary work.

Referring to FIG. 4, equal parts of the variable diameter surface include an arc section with a decreasing distance from large to small relative to the circle center of the variable diameter surface, an arc section with an increasing distance from small to large relative to the circle center of the variable diameter surface, and an arc section with a non-variable diameter. The arc sections A1, A2 and A3 are arc sections with a decreasing distance from large to small relative to the circle center and are arc sections where the bearing driving inner ring 1 generates a tangential force on the bearing driven outer ring 2. The arc sections B1, B2 and B3 are arc sections with an increasing distance from small to large relative to the circle center, and are arc sections for the recovery of the length of the movable teeth, and are arc sections where the bearing driving inner ring 1 doesn't generate a tangential force on the bearing driven outer ring 2.

Figure 5:
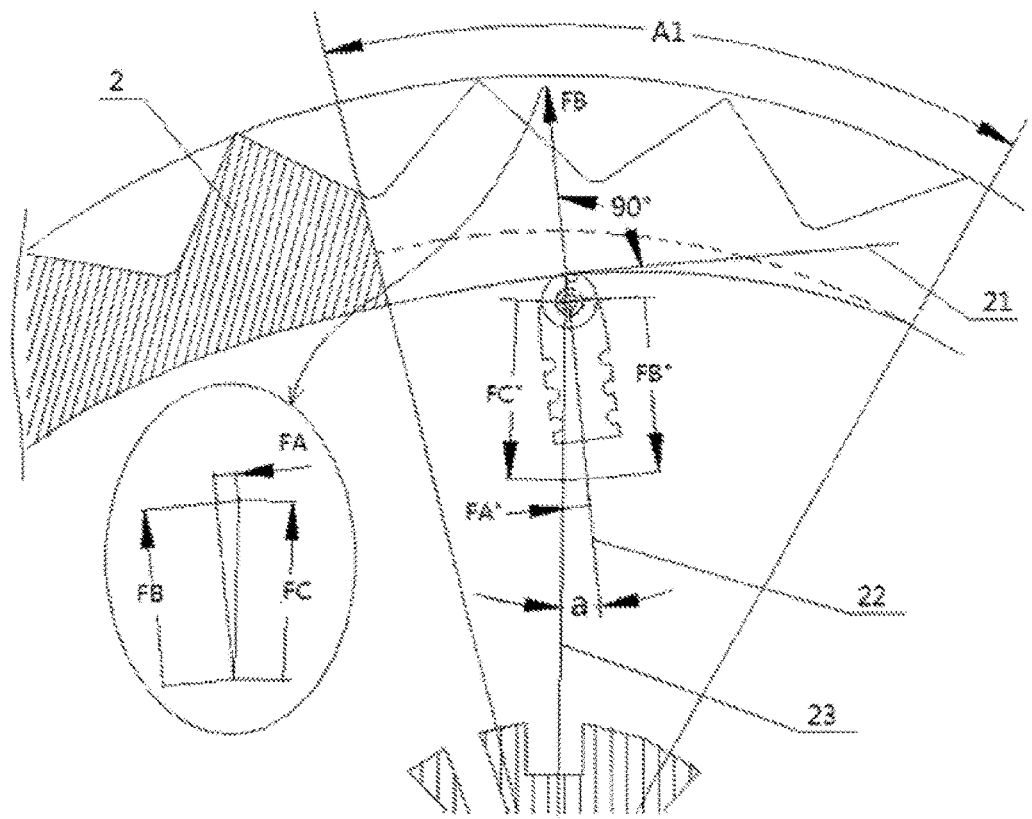
FIG. 5 is a force analysis diagram of a movable tooth assembly and a part of a variable diameter surface of the invention, in which 21 represents an arc surface tangent line at a contact point on the arc section A where the movable teeth contacts variable diameter surface, 22 represents a vertical line vertical to the arc surface tangent line 21, 23 represents a connecting line between the contact point on the arc section A where the movable teeth contacts variable diameter surface and the circle center of the bearing driving inner ring 1.

Referring to FIG. 2 and FIG. 5, when a continuously variable speed power bearing is in operation, the bearing driving inner ring 1 drives the movable tooth assembly 3 to rotate anticlockwise. Under the pressure action of the high-pressure oil at the bottom of the movable tooth grooves 4, the movable tooth assembly 3 presses against the variable diameter surface. When the distance between the variable diameter surface by which the movable teeth passes and the circle center is decreasing from large to small, the movable teeth generate an acting force FB perpendicular to the tangent plane of the variable diameter surface, namely the pressure FB of the high-pressure oil at the bottom of the movable teeth. The FB is the resultant force of a component force FC of the FB in the radial direction of the bearing driving inner ring 1 and the tangential force FA generated by the torque force of the bearing driving inner ring 1. A reaction force generated by the variable-diameter surface on the movable tooth assembly is FB", and the reaction force FB" is equal to the FB and opposite in direction. When the distance between the variable diameter surface and the circle center is increasing from small to large, the movable teeth extend outwards under the actions of the centrifugal force and the hydraulic oil to restore the maximum length within the variable diameter surface, and the movable teeth do not generate rotary tangential forces on the variable diameter surface. When the distance between the variable-diameter surface and the circle center is not changed, the movable teeth freely rotate within the variable-diameter surface. There is an included angle of $90°+\alpha$ between the arc surface tangent line 21 at the contact point where the arc section A contacts with the variable diameter surface and the connecting line 23 from the contact point to the circle center of the bearing driving inner ring 1. The offset angle $\alpha$ of the movable tooth grooves are adjusted, so that the movable teeth only bear a vertical acting force of the arc surface when passing through the A section area, with no tangential force, and thus reducing a lateral force when the movable teeth move within the movable tooth grooves.

Referring to FIG. 4 and FIG. 5, the driving inner ring 1 drives the movable tooth assembly 3 to rotate anticlockwise, and the movable tooth assembly 3 exerts rotary arc tangential thrusts FA on the bearing driven outer ring 2 through three arc sections A1, A2 and A3. The shapes of the three equal-arc surfaces are consistent, so that the tangential thrusts are also consistent, and thus the radial force of the bearing is balanced.

As shown in FIG. 3, the speed ratio control unit 61 controls the high-pressure oil output pressure of the high-pressure oil pump 62, and the high-pressure oil output pressure is added to the bottom of each movable tooth groove through a high-pressure oil inlet 5. The pressure of the high-pressure oil is gradually increased, and the torque of the driving inner ring exerted on the driven outer ring is gradually increased, so that the function of a virtual clutch is realized.

Referring to FIG. 1 and FIG. 4, and the power input to the bearing driving inner ring 1 is output to the bearing driven outer ring 2 by controlling the pressure of the high-pressure oil. An expression $N2/N1=(T1/T2)*\eta$ of a formula (5) is deduced according to the energy conservation principle. The rotating speed N2 of the driven outer ring is inversely proportional to the external load T2 of the driven outer ring, and thus the external load exerted on the driven outer ring determines the rotating speed of the bearing driven outer ring. The rotating speed of the bearing driven outer ring is changed along with the change of the external load, realizing the self-adaptive change of the speed ratio.

Analysis and calculation of a torque output and a speed change of the variable speed bearing are described below.

Engine output power calculation formula:

$$P=T*N/9550 \qquad (1)$$

Wherein P is the output power of the engine and the unit is kilowatt; T is the output torque of the engine and the unit is newton meter; N is the output rotating speed of the engine, and the unit is revolutions per minute.

Therefore, the rotating power of the bearing driving inner ring is $$P1=T1*N1/9550 \qquad (2)$$

Wherein P1 is the output power of the bearing driving inner ring; T1 is the output torque of the bearing driving inner ring; N1 is the output rotating speed of the bearing driving inner ring.

The rotating power of the bearing driven outer ring is $$P2=T2*N2/9550 \qquad (3)$$

Wherein P2 is the output power of the bearing driven outer ring; T2 is the output torque of the bearing driven outer ring; N2 is the output rotating speed of the bearing driven outer ring.

According to the energy conservation law, $P2=P1*\eta$.

Wherein $\eta$ is the efficiency of doing work on the bearing driven outer ring by the bearing driving inner ring.

A following formula is deduced from formulas (2), (3) and (4):

$$N2/N1=(T1/T2)*\eta \qquad (5)$$

As seen from the formula (5), the change of the output speed ratio is inversely proportional to the change of the output torque, namely, the multiple of the decreased output rate is equal to the multiple of the increased output torque.

Figure 6:
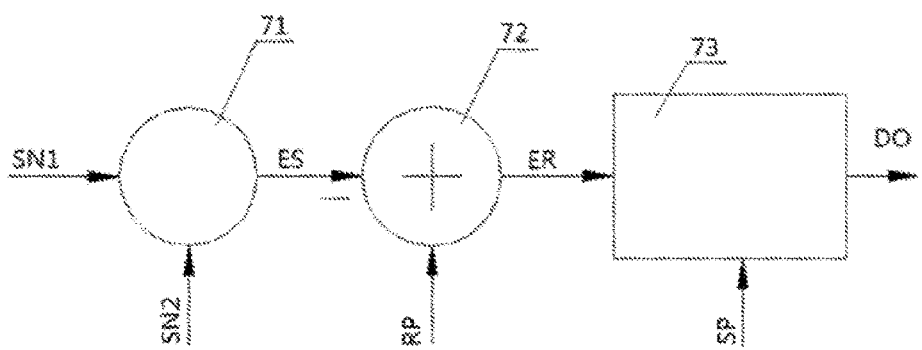
FIG. 6 is a block diagram of a variable speed control operation process of the present invention.

Referring to FIG. 6, a block diagram of a variable speed control operation process is shown, wherein 71 is a variation rate calculator for calculating the actual variation rate ES of the bearing driving inner ring 1 and the bearing driven outer ring 2; 72 is a rate error comparator for calculating an error value ER between the actual variation rate ES and the variation rate RP given by the system; and then the control output signal value DO required for the high-pressure oil pump 63 is calculated by the calculation controller 73, so that the output pressure of the oil pump is regulated to the required pressure for the required transmission speed ratio.

As shown in FIG. 1, a continuously variable speed power bearing comprises a bearing driving inner ring 1 and a bearing driven outer ring 2, a movable tooth assembly 3 and a movable tooth transmission. A circle of movable tooth grooves 4 are arranged on the periphery of the bearing driving inner ring 1. The movable teeth of movable tooth assembly 3 are embedded into the corresponding movable tooth grooves 4 in a one-to-one mode. The bottoms of the movable tooth grooves 4 are connected to a high-pressure oil inlet 5 on the bearing driving inner ring through a high-pressure oil way 6. The inner peripheral surface of the bearing driven outer ring 2 is a variable diameter surface 7, while the outer peripheral surface is a power output surface 8. The power output surface 8 is in form of a tooth, a roller column or a circumferential surface. The variable diameter surface is evenly divided into three equal parts, and each corresponding equal part has an equal variable diameter and the same direction. The outer end part of the movable tooth assembly 3 fits the variable diameter surface.

As shown in FIG. 2, each movable tooth of the movable tooth assembly 3 comprises a movable tooth supporting body 31 and a rolling column movable tooth 32 connected to the outer end of the movable tooth supporting body 31. A row of circular notches 33 are formed on each side of the movable tooth supporting body 31, opposite to the movable tooth groove 4.

As shown in FIG. 3, the movable tooth transmission comprises a speed ratio control unit 61, a high-pressure oil pump 62, a bearing driven outer ring speed sensor 63, a speed ratio given signal input end 64 and a bearing driving inner ring rotating speed signal input end 65, wherein the high-pressure oil pump 62, the bearing driven outer ring speed sensor 63, the speed ratio given signal input end 64 and the bearing driving inner ring rotating speed signal input end 65 are respectively connected to the speed ratio control unit 61. The high-pressure oil outlet 66 of the high-pressure oil pump is connected to the high-pressure oil inlet 5. The speed ratio control unit 61 acquires an oil pressure signal of the high-pressure oil pump 62 and outputs a control signal to the high-pressure oil pump 63 through the control output terminal to control the output pressure of the high-pressure oil. The bearing driven outer ring speed sensor 63 is used for acquiring the rotating speed signal of the bearing driven outer ring 2. The speed ratio given signal input end 64 and the bearing driving inner ring rotating speed signal input end 65 are connected to the system control center 67, and are used for acquiring a rotating speed signal of the bearing driving inner ring 1 and a speed ratio given signal of the bearing driving inner ring 1 and the bearing driven outer ring 2.

Referring to FIG. 4, equal parts of the variable diameter surface include an arc section with a decreasing distance from large to small relative to the circle center of the variable diameter surface, an arc section with an increasing distance from small to large relative to the circle center of the variable diameter surface, and an arc section with a non-variable diameter. The arc sections A1, A2 and A3 are arc sections with a decreasing distance from large to small relative to the circle center and are arc sections where the bearing driving inner ring 1 generates a tangential force on the bearing driven outer ring 2. The arc sections B1, B2 and B3 are arc sections with an increasing distance from small to large relative to the circle center, and are arc sections for the recovery of the length of the movable teeth, and are arc sections where the bearing driving inner ring 1 doesn't generate a tangential force on the bearing driven outer ring 2.

Referring to FIG. 2 and FIG. 5, when a continuously variable speed power bearing is in operation, the bearing driving inner ring 1 drives the movable tooth assembly 3 to rotate anticlockwise. Under the pressure action of the high-pressure oil at the bottom of the movable tooth grooves 4, the movable tooth assembly 3 presses against the variable diameter surface. When the distance between the variable diameter surface by which the movable teeth passes and the circle center is decreasing from large to small, the movable teeth generate an acting force FB perpendicular to the tangent plane of the variable diameter surface, namely the pressure FB of the high-pressure oil at the bottom of the movable teeth. The FB is the resultant force of a component force FC of the FB in the radial direction of the bearing driving inner ring 1 and the tangential force FA generated by the torque force of the bearing driving inner ring 1. A reaction force generated by the variable-diameter surface on the movable tooth assembly is FB", and the reaction force FB" is equal to the FB and opposite in directions. When the distance between the variable diameter surface and the circle center is increasing from small to large, the movable teeth extend outwards under the actions of the centrifugal force and the hydraulic oil to restore the maximum length within the variable diameter surface, and the movable teeth do not generate rotary tangential forces on the variable diameter surface. When the distance between the variable-diameter surface and the circle center is not changed, the movable teeth freely rotate within the variable-diameter surface. There is an included angle of 90°+α between the arc surface tangent line 21 at the contact point where the arc section A contacts with the variable diameter surface and the connecting line 23 from the contact point to the circle center of the bearing driving inner ring 1. The offset angle α of the movable tooth grooves are adjusted, so that the movable teeth only bear a vertical acting force of the arc surface when passing through the A section area, with no tangential force, and thus reducing a lateral force when the movable teeth move within the movable tooth grooves.

Referring to FIG. 4 and FIG. 5, the driving inner ring 1 drives the movable tooth assembly 3 to rotate anticlockwise, and the movable tooth assembly 3 exerts rotary arc tangential thrusts FA on the bearing driven outer ring 2 through three arc sections A1, A2 and A3. The shapes of the three equal-arc surfaces are consistent, so that the tangential thrusts are also consistent, and thus the radial force of the bearing is balanced.

As shown in FIG. 3, the speed ratio control unit 61 controls the high-pressure oil output pressure of the high-pressure oil pump 62, and the high-pressure oil output pressure is added to the bottom of each movable tooth groove through a high-pressure oil inlet 5. The pressure of the high-pressure oil is gradually increased, and the torque of the driving inner ring exerted on the driven outer ring is gradually increased, so that the function of a virtual clutch is realized.

Referring to FIG. 1 and FIG. 4, and the power input to the bearing driving inner ring 1 is output to the bearing driven outer ring 2 by controlling the pressure of the high-pressure oil. An expression $N2/N1=(T1/T2)*\eta$ of a formula (5) is deduced according to the energy conservation principle. The rotating speed N2 of the driven outer ring is inversely proportional to the external load T2 of the driven outer ring, and thus the external load exerted on the driven outer ring determines the rotating speed of the bearing driven outer ring. The rotating speed of the bearing driven outer ring is changed along with the change of the external load, realizing the self-adaptive change of the speed ratio.

Analysis and calculation of a torque output and a speed change of the variable speed bearing are described below.

Engine output power calculation formula:

$$P=T*N/9550 \quad (1)$$

Wherein P is the output power of the engine and the unit is kilowatts; T is the output torque of the engine and the unit is newton meters; N is the output rotating speed of the engine, and the unit is revolutions per minute.

Therefore, the rotating power of the bearing driving inner ring is $$P1=T1*N1/9550 \quad (2)$$

Wherein P1 is the output power of the bearing driving inner ring; T1 is the output torque of the bearing driving inner ring; N1 is the output rotating speed of the bearing driving inner ring.

The rotating power of the bearing driven outer ring is $$P2=T2*N2/9550 \quad (3)$$

Wherein P2 is the output power of the bearing driven outer ring; T2 is the output torque of the bearing driven outer ring; N2 is the output rotating speed of the bearing driven outer ring.

According to the energy conservation law, $P2=P1*\eta$.

Wherein η is the efficiency of doing work on the bearing driven outer ring by the bearing driving inner ring.

A following formula is deduced from formulas (2), (3) and (4):

$$N2/N1=(T1/T2)*\eta \quad (5)$$

As seen from the formula (5), the change of the output speed ratio is inversely proportional to the change of the output torque, namely, the multiple of the decreased output rate is equal to the multiple of the increased output torque.

Referring to FIG. 6, a block diagram of a variable speed control operation process is shown, wherein 71 is a variation rate calculator for calculating the actual variation rate ES of the bearing driving inner ring 1 and the bearing driven outer ring 2; 72 is a rate error comparator for calculating an error value ER between the actual variation rate ES and the variation rate RP given by the system; and then the control output signal value DO required for the high-pressure oil pump 63 is calculated by the calculation controller 73, so that the output pressure of the oil pump is regulated to the required pressure for the required transmission speed ratio.

According to the present invention, the power of the bearing inner ring can be transmitted to the bearing outer ring asynchronously in the rotating process of the bearing. The continuously variable speed is realized through adjustment of the pressure of the high-pressure oil. Therefore, the continuously variable speed with a high efficiency and a large-torque is realized. Meanwhile, the present invention has the advantages of radial power balance, a low noise, a compact structure, a small size and low manufacturing costs, and thus has certain industrial practicability.

What is claimed is:

1. A continuously variable speed power bearing, comprising:
   a bearing driving inner ring,
   a bearing driven outer ring, and
   a movable tooth assembly;
   wherein a circle of movable tooth grooves are arranged on a periphery of the bearing driving inner ring, movable teeth of the movable tooth assembly are embedded into corresponding movable tooth grooves in a one-to-one mode, and bottoms of the movable tooth grooves are connected to a high-pressure oil inlet;
   wherein an inner peripheral surface of the bearing driven outer ring is a variable diameter surface, the variable diameter surface is evenly divided into a plurality of equal parts, each corresponding equal part has an equal variable diameter and a same direction, and an outer end part of the movable tooth assembly fits the variable diameter surface.

2. The continuously variable speed power bearing of claim 1, wherein, each movable tooth of the movable tooth assembly comprises a movable tooth supporting body and a rolling column movable tooth connected to an outer end of the movable tooth supporting body, and a plurality of notches are formed on a side of the movable tooth supporting body, opposite to a corresponding movable tooth groove.

3. The continuously variable speed power bearing of claim 1, wherein, further comprises a movable tooth transmission, the movable tooth transmission comprises a speed ratio control unit, a high-pressure oil pump, a bearing driven outer ring speed sensor for measuring a speed of the bearing driven outer ring, a speed ratio given signal input end and a bearing driving inner ring rotating speed signal input end, wherein a high-pressure oil outlet of the high-pressure oil pump is connected to a high-pressure oil inlet, and the speed ratio given signal input end and the bearing driving inner ring rotating speed signal input end are connected to a system control center.

4. The continuously variable speed power bearing of claim 1, wherein, an outer peripheral surface is a power output surface, and the power output surface is in form of a tooth, a roller column or a circumferential surface.

5. The continuously variable speed power bearing of claim 1, wherein, the high-pressure oil inlet is provided on the bearing driving inner ring, and the bottoms of the movable tooth grooves are connected to the high-pressure oil inlet through a high-pressure oil way.

6. The continuously variable speed power bearing of claim 1, wherein, the equal parts of the variable diameter surface include an arc section with a decreasing distance from large to small relative to the circle center of the variable diameter surface, an arc section with an increasing distance from small to large relative to the circle center of the variable diameter surface, and an arc section with a non-variable diameter.

7. The continuously variable speed power bearing of claim 3, wherein, the high-pressure oil inlet is provided on the bearing driving inner ring, and the bottoms of the movable tooth grooves are connected to the high-pressure oil inlet through a high-pressure oil way.

* * * * *